UNITED STATES PATENT OFFICE.

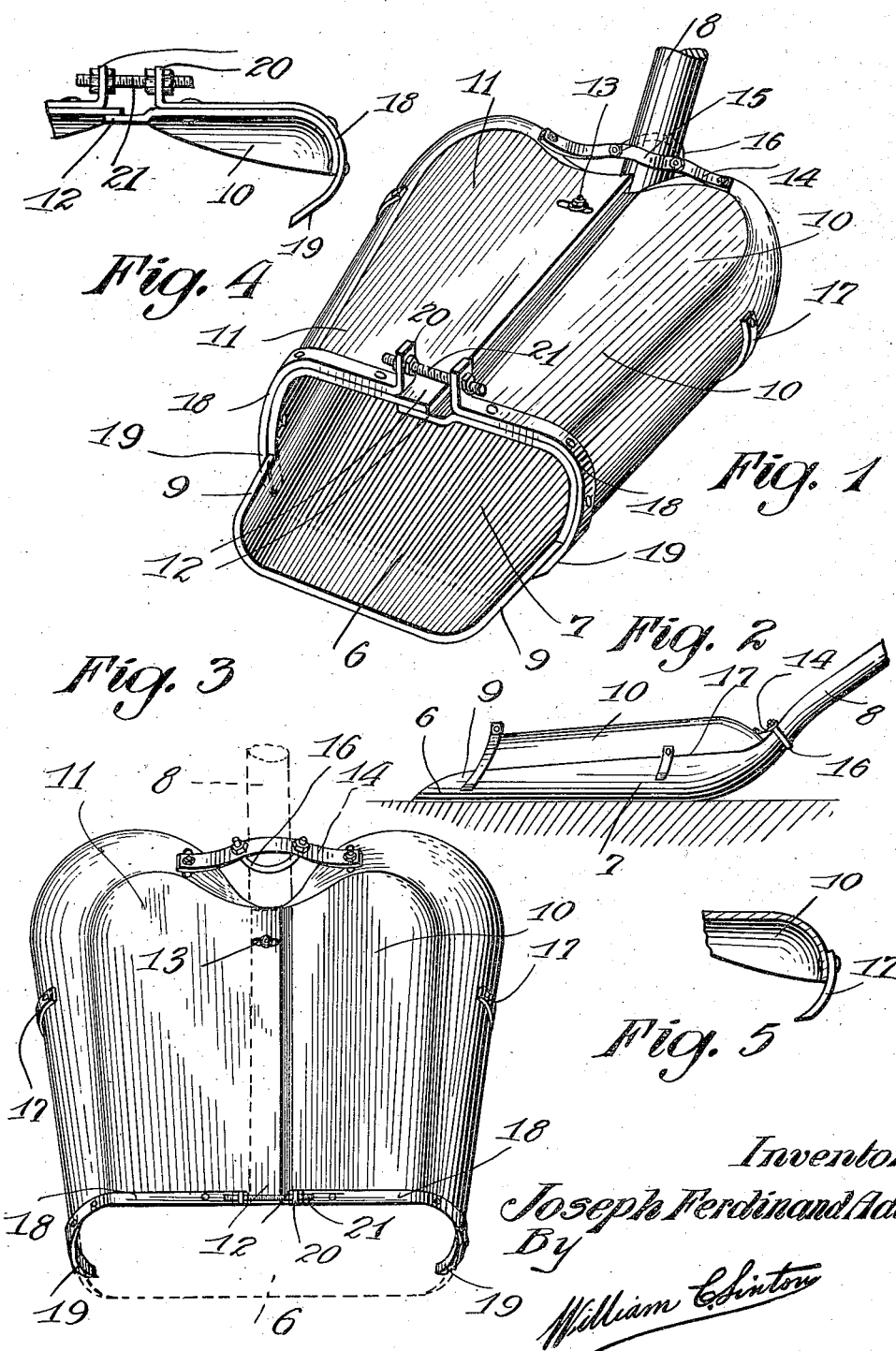

JOSEPH FERDINAND ADAM, OF MARENGO, SASKATCHEWAN, CANADA.

ATTACHMENT FOR SHOVELS.

1,426,442.  Specification of Letters Patent.  Patented Aug. 22, 1922.

Application filed March 5, 1921. Serial No. 449,758.

*To all whom it may concern:*

Be it known that I, JOSEPH FERDINAND ADAM, a subject of the King of Great Britain, residing at Marengo, in the Province of Saskatchewan, Canada, have invented certain new and useful Improvements in Attachments for Shovels, and do hereby declare that the following is a full, clear, and exact description of the invention, such as will enable others skilled in the art to which it appertains to make and use the same.

The present invention relates to new and useful improvements in attachments for shovels, scoops and the like.

The primary object of the invention, is the provision of an attachment for shovels and the like, which will prevent the loss of the contents, thereof, during the usual operation of the said shovel.

Another object of the invention, is the provision of a cover for shovels and the like, which will prevent loss of the contents and the like, together with means for retaining said cover in its desired position, against displacement.

Still another object of the invention is the provision of an attachment for shovels or the like, for the purposes above specified, which is provided with novel means, whereby the same can be adjusted, and held in such adjusted position, to conform to shovels of various sizes and shapes.

A further object of the invention is the provision of an attachment for shovels, such as above described, which will be comparatively simple and inexpensive to manufacture, reliable and efficient in use, and readily operated.

With the above and other objects in view, the present invention resides in the novel features of construction, formation, combination, and arrangements of parts, to be hereinafter more fully described, claimed, and illustrated in the accompanying drawings, forming a part of the present application, and in which:

Figure 1 is a perspective view of the shovel carrying the attachment applied thereto;

Figure 2 is a side elevation thereof;

Figure 3 is a plan view showing the shovel in dotted lines;

Figure 4 is a detail front elevation of a portion of a shovel; and,

Figure 5 is a transverse sectional view, taken through one edge of the attachment.

Referring to the accompanying drawings, by corresponding characters of reference, throughout the several views, the numeral 6 designates my improved shovel, which comprises a body portion 7, to one end of which is attached a handle 8.

The opposite sides of the body portion 7 are curved upwardly slightly in the usual manner producing side edges 9.

My improved attachment is shown at 10, and comprises a cover, spaced above the body portion 7 of the shovel and including adjustable sections 11, provided with overlapping edges 12, the rear ends of which are attached together by a bolt and slot arrangement shown at 13, in order that the said sections 11 will be pivotally connected and adjustable relative to each other.

A strap 14 is secured to the rear ends of the sections 11 and is bowed intermediate its ends as at 15 to engage the handle 8, while a U-bolt 16 passes through the strap 14 for attaching the cover 10 to the handle 8 at the rear extremity thereof.

A pair of clips 17 are rigidly secured to the sides of the sections 11 adjacent the rear ends thereof, and embrace the opposite sides 9 of the shovel 6, while secured to the forward edges of the sections 11, rigidly, are straps 18, the lower ends of which are bent to form clips 19, similar to the before mentioned clips 17, for embracing the sides 9 of the shovel, while the inner ends thereof are bent upwardly as at 20 and perforated for the reception of a locking bolt 21, which passes through the perforated extensions 20, and forms a means for tightening the clips 19 on the opposite sides of the shovel 6.

When the cover or attachment 11 is applied, as shown in Figures 1, 2 or 3 of the drawing, the latter will be held upon the shovel against any undesired displacement and forms a compartment from which the displacement of the contents of the shovel, is prevented.

It will be seen that the lower edges of the attachment 11 rests upon the upper edges 9 of the shovel 6, thus providing a compact structure, which will remain firmly in position.

From the foregoing description taken in connection with the accompanying drawings, it will be manifest, that a shovel attachment is provided which will fulfill all of the necessary requirements of such a device, and it is to be understood in this connection, that various minor changes in the specific details of construction, can be resorted to, within the scope of the appended claims, without departing from the spirit, or sacrificing any of the advantages of the invention, and it is to be further understood, that the attachment can be applied to shovels used for any desired purposes, to which the several parts thereof will adapt themselves.

Having thus fully described the invention, what I claim as new and desire to protect by Letters Patent is:

1. The combination with a shovel, such as above described, of an attachment therefor, including a pair of sections, means for connecting said sections, and clips attached to the sides of said sections, for engaging the shovel and preventing the displacement of said attachment.

2. The combination with a shovel such as above described, of an attachment including a plurality of sections, a strap attached to the rear end of one of said sections, for engaging the handle of the shovel, means for securing the strap to said handle, and clips secured to the sides of said attachment for engaging the sides of said shovel, as and for the purposes set forth.

3. The combination in a device of the character described, with a shovel, including a pair of sections, a slot and bolt connection for said sections, at one end thereof, whereby they can be adjusted, means for attaching said sections to the handle of the shovel, means for attaching said sections to the sides of the shovel, and means for adjusting the forward ends of said sections, as and for the purposes set forth.

4. As a new article of manufacture, an attachment for shovels, including a pair of adjustable sections, a bolt and slot connection, at the one end of said sections, clips secured to the sides of said sections, adjacent their rear ends, a strap secured to the rear ends of said sections, straps secured to the forward ends of said sections, clips formed upon the lower ends of said forward straps, extensions formed upon the inner ends of said straps, a bolt passing through said extensions, and an overlapping arrangement at the meeting edges of said sections, substantially as and for the purposes set forth.

In witness whereof I have hereunto set my hand.

JOSEPH FERDINAND ADAM.